United States Patent
Gan et al.

(10) Patent No.: US 12,200,791 B2
(45) Date of Patent: Jan. 14, 2025

(54) COMMUNICATION METHOD AND MULTI-LINK DEVICE

(71) Applicant: HUAWEI TECHNOLOGIES CO., LTD., Guangdong (CN)

(72) Inventors: Ming Gan, Shenzhen (CN); Yiqing Li, Shenzhen (CN); Yuchen Guo, Shenzhen (CN); Guogang Huang, Shenzhen (CN); Yunbo Li, Shenzhen (CN); Yuxin Lu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/598,609

(22) Filed: Mar. 7, 2024

(65) Prior Publication Data

US 2024/0215093 A1 Jun. 27, 2024

Related U.S. Application Data

(63) Continuation of application No. PCT/CN2022/117829, filed on Sep. 8, 2022.

(30) Foreign Application Priority Data

Sep. 9, 2021 (CN) .......................... 202111056745.6

(51) Int. Cl.
*H04W 28/02* (2009.01)
*H04L 5/00* (2006.01)
(Continued)

(52) U.S. Cl.
CPC ........... *H04W 76/15* (2018.02); *H04L 5/0053* (2013.01); *H04W 88/10* (2013.01)

(58) Field of Classification Search
CPC ..... H04W 76/15; H04W 88/10; H04W 76/11; H04L 5/0053
See application file for complete search history.

(56) References Cited

U.S. PATENT DOCUMENTS

2019/0044794 A1\* 2/2019 Chew .................. H04L 41/0672
2019/0044949 A1\* 2/2019 Bartfai-Walcott .... H04W 12/63
(Continued)

FOREIGN PATENT DOCUMENTS

| CN | 112788716 A | 5/2021 |
| CN | 112911687 A | 6/2021 |

(Continued)

OTHER PUBLICATIONS

3GPP TSG RAN WG1 Meeting#98bis, R1-1910060 Title:QoS management for NR sidelink (Year: 2019).\*
(Continued)

*Primary Examiner* — Faruk Hamza
*Assistant Examiner* — Abusayeed M Haque
(74) *Attorney, Agent, or Firm* — Fish & Richardson P.C.

(57) ABSTRACT

This application provides communication methods, apparatus and systems. In an example method, a first station (STA) of a station multi-link device (STA MLD) sends a request frame to an access point multi-link device (AP MLD), wherein the request frame is used to request to establish single-link communication, and an address 2 field in the request frame is set to a media access control (MAC) address of the STA MLD. The first STA receives a response frame from the AP MLD, wherein the response frame indicates that the single-link communication is successfully established. The first STA performs air interface transmission with the AP MLD according to the single-link communication.

17 Claims, 3 Drawing Sheets

(51) Int. Cl.
  H04W 8/26   (2009.01)
  H04W 76/12  (2018.01)
  H04W 76/15  (2018.01)
  H04W 88/10  (2009.01)

(56) References Cited

U.S. PATENT DOCUMENTS

| | | | |
|---|---|---|---|
| 2021/0266931 A1 | 8/2021 | Kwon et al. | |
| 2021/0377369 A1* | 12/2021 | Patil | H04L 41/082 |
| 2024/0129980 A1* | 4/2024 | Ho | H04W 12/03 |
| 2024/0137191 A1* | 4/2024 | Nemeth | H04L 5/16 |
| 2024/0138007 A1* | 4/2024 | Chu | H04W 76/15 |
| 2024/0154880 A1* | 5/2024 | Jeong | H04W 24/06 |

FOREIGN PATENT DOCUMENTS

| | | |
|---|---|---|
| CN | 113365327 A | 9/2021 |
| RU | 2751081 C2 | 7/2021 |
| WO | 2021011476 A1 | 1/2021 |
| WO | 2021062153 A1 | 4/2021 |
| WO | 2021172919 A1 | 9/2021 |

OTHER PUBLICATIONS

IEEE P802.11be/D0.1, "Draft Standard for Information technology—Tele-communications and information exchange between systems Local and metropolitan area networks—Specific requirements, Part 11: Wireless LAN Medium Access Control, (MAC) and Physical Layer (PHY) Specifications, Amendment 8: Enhancements for extremely high throughput (EHT)," Sep. 2020, 299 pages.

International Search Report and Written Opinion in International Appln. No. PCT/CN2022/117829, mailed on Nov. 28, 2022, 11 pages (with partial English translation).

Office Action in Russian Appin. No. 2024109360/07(021005), mailed on Sep. 2, 2024, 16 pages (with English machine translation).

Jang et al., "TGbe D0.3 Comment Resolutions for Subclause 35.3.5.4," IEEE 802.11-21/499r6, Mar. 2021, 11 pages.

Patil et al., "Resolution for CIDs related to TDLS operation with MLO (CC34/CC36)," IEEE 802.11-21/0240r10, Mar. 2021, 10 pages.

Extended European Search Report in European Appln. No. 22866706.9, mailed on Oct. 30, 2024, 14 pages.

* cited by examiner

COMMUNICATION METHOD AND MULTI-LINK DEVICE

CROSS-REFERENCE TO RELATED APPLICATIONS

This application is a continuation of International Application No. PCT/CN2022/117829, filed on Sep. 8, 2022, which claims priority to Chinese Patent Application No. 202111056745.6, filed on Sep. 9, 2021. The disclosures of the aforementioned applications are hereby incorporated by reference in their entireties.

TECHNICAL FIELD

This application relates to the field of communication technologies, and more specifically, to a communication method and a multi-link device.

BACKGROUND

A next generation wireless local area network (wireless local area network, WLAN) standard develops and evolves toward a direction of increasing throughput, and one key technology is multi-link (multi-link) communication. A multi-link device is a device that supports multi-link communication. When two multi-link devices perform air interface transmission, a plurality of links may be established between the two multi-link devices. However, there may be a case in which only one link is successfully established between the two multi-link devices, or only one link is available. In this case, how to perform air interface transmission between two multi-link devices is a problem to be resolved.

SUMMARY

This application provides a communication method and a multi-link device, to implement air interface transmission between two multi-link devices according to a single-link communication rule when only one link is successfully established between the two multi-link devices.

According to a first aspect, a communication method is provided. The method may be performed by a multi-link device, or may be performed by a component (for example, a chip or a circuit) of a multi-link device. This is not limited herein. For ease of description, the following uses an example in which the method is performed by a first multi-link device for description.

The method may include: When only one of a plurality of links is successfully established, a first multi-link device MLD performs air interface transmission with a second MLD according to a single-link communication rule.

In an example, the plurality of links may be a plurality of links that the first MLD requests to establish.

In another example, the plurality of links may be a plurality of links that have been successfully established between the first MLD and the second MLD.

According to the solution of this application, when only one of the plurality of links is successfully established, the first MLD performs air interface transmission with the second MLD according to the single-link communication rule, rather than perform air interface transmission according to a multi-link communication rule. In this manner, when only one link is successfully established between the first MLD and the second MLD, the single-link communication rule better suits a current link connection status between the first MLD and the second MLD.

With reference to the first aspect, in some implementations of the first aspect, the first MLD performing air interface transmission with the second MLD according to the single-link communication rule includes:

The first MLD sends, to the second MLD, a first frame over the air, where an address 2 field in the first frame over the air is set to a media access control MAC address of the first MLD.

According to the solution of this application, when only one of the plurality of links is successfully established, the address 2 field carried in the frame over the air that is sent by the first MLD is set to the MAC address of the first MLD. In a secure procedure, an address used by the first MLD for key generation may also be the MAC address of the first MLD. Therefore, according to the solution in this application, the address used by the first MLD for key generation may be consistent with the address 2 field carried in air interface transmission.

With reference to the first aspect, in some implementations of the first aspect, an address 1 field in the first frame over the air is set to a MAC address of the second MLD.

With reference to the first aspect, in some implementations of the first aspect, the method further includes:

The first MLD receives, from the second MLD, a second frame over the air, where an address 1 field in the second frame over the air is set to the MAC address of the first MLD.

With reference to the first aspect, in some implementations of the first aspect, an address 2 field in the second frame over the air is set to the MAC address of the second MLD.

With reference to the first aspect, in some implementations of the first aspect, only one of the plurality of links being successfully established includes:

The first MLD sends a first request frame to the second MLD, where the first request frame is used to request to establish a plurality of links; and the first MLD receives a first response frame from the second MLD, where the first response frame does not include a first multi-link element.

In this manner, when the first response frame does not include a first multi-link element, the first response frame may implicitly indicate that only one of the plurality of links requested by the first MLD is successfully established.

According to the solution of this application, when the first response frame does not include the first multi-link element, resource consumption for transmission of the first response can be reduced.

With reference to the first aspect, in some implementations of the first aspect, only one of the plurality of links being successfully established includes:

Only one of the plurality of links is successfully established through multi-link reconfiguration.

According to a second aspect, a communication method is provided. The method may be performed by a multi-link device, or may be performed by a component (for example, a chip or a circuit) of a multi-link device. This is not limited herein. For ease of description, the following uses an example in which the method is performed by a second multi-link device for description.

The method may include: When only one of a plurality of links is successfully established, a second multi-link device MLD performs air interface transmission with a first MLD according to a single-link communication rule.

It should be understood that the plurality of links may be a plurality of links that the first MLD requests to establish, or the plurality of links may be a plurality of links that have been successfully established between the first MLD and the second MLD.

According to the solution of this application, when only one of the plurality of links is successfully established, the second MLD performs air interface transmission with the first MLD according to the single-link communication rule, rather than perform air interface transmission according to a multi-link communication rule.

With reference to the second aspect, in some implementations of the second aspect, the second MLD performing air interface transmission with the first MLD according to the single-link communication rule includes:

The second MLD sends, to the first MLD, a second frame over the air, where an address 1 field in the second frame over the air is set to a media access control MAC address of the first MLD.

With reference to the second aspect, in some implementations of the second aspect, an address 2 field in the second frame over the air is set to a MAC address of the second MLD.

According to the solution of this application, when only one of the plurality of links is successfully established, the address 2 field carried in the frame over the air that is sent by the second MLD is set to the MAC address of the second MLD. In a secure procedure, an address used by the second MLD for key generation may also be the MAC address of the second MLD.

Therefore, according to the solution in this application, the address used by the second MLD for key generation may be consistent with the address 2 field carried in air interface transmission.

With reference to the second aspect, in some implementations of the second aspect, the method further includes:

The second MLD, receives from the first MLD, a first frame over the air, where an address 2 field in the first frame over the air is set to the MAC address of the first MLD.

With reference to the second aspect, in some implementations of the second aspect, an address 1 field in the first frame over the air is set to the MAC address of the second MLD.

With reference to the second aspect, in some implementations of the second aspect, only one of the plurality of links being successfully established includes:

The second MLD receives a first request frame from the first MLD, where the first request frame is used to request to establish a plurality of links; and the second MLD sends a first response frame to the first MLD, where the first response frame does not include a first multi-link element.

With reference to the second aspect, in some implementations of the second aspect, only one of the plurality of links being successfully established includes:

Only one of the plurality of links is successfully established through multi-link reconfiguration.

According to a third aspect, a communication method is provided. The method may be performed by a multi-link device, or may be performed by a component (for example, a chip or a circuit) of a multi-link device. This is not limited herein. For ease of description, the following uses an example in which the method is performed by a first multi-link device for description.

The method may include: A first MLD sends a second request frame to a second MLD, where the second request frame is used to request to establish single-link communication, and an address 2 field in the second request frame is set to a MAC address of the first MLD; the first MLD receives a second response frame from the second MLD, where the second response frame indicates that single-link communication is successfully established; and the first MLD performs air interface transmission with the second MLD according to a single-link communication rule.

With reference to the third aspect, in some implementations of the third aspect, an address 1 field in the second response frame is set to the MAC address of the first MLD.

With reference to the third aspect, in some implementations of the third aspect, the second request frame and the second response frame do not carry a multi-link element.

With reference to the third aspect, in some implementations of the third aspect, the first MLD performing air interface transmission with the second MLD according to the single-link communication rule includes:

The first MLD sends, to the second MLD, a first frame over the air, where an address 2 field in the first frame over the air is set to the media access control MAC address of the first MLD.

With reference to the third aspect, in some implementations of the third aspect, an address 1 field in the first frame over the air is set to a MAC address of the second MLD.

According to a fourth aspect, a communication method is provided. The method may be performed by a multi-link device, or may be performed by a component (for example, a chip or a circuit) of a multi-link device. This is not limited herein. For ease of description, the following uses an example in which the method is performed by a second multi-link device for description.

The method may include: A second MLD receives a second request frame from a first MLD, where the second request frame is used to request to establish single-link communication, and an address 2 field in the second request frame is set to a MAC address of the first MLD; the second MLD sends a second response frame to the first MLD, where the second response frame indicates that single-link communication is successfully established; and the second MLD performs air interface transmission with the first MLD according to a single-link communication rule.

With reference to the fourth aspect, in some implementations of the fourth aspect, an address 1 field in the second response frame is set to the MAC address of the first MLD.

With reference to the fourth aspect, in some implementations of the fourth aspect, the second request frame and the second response frame do not carry a multi-link element.

With reference to the fourth aspect, in some implementations of the fourth aspect, the second MLD performing air interface transmission with the first MLD according to the single-link communication rule includes:

The second MLD sends, to the first MLD, a second frame over the air, where an address 1 field in the second frame over the air is set to the media access control MAC address of the first MLD.

With reference to the fourth aspect, in some implementations of the fourth aspect, an address 2 field in the second frame over the air is set to a MAC address of the second MLD.

According to a fifth aspect, a first multi-link device MLD is provided, including: a processing unit and a transceiver unit connected to the processing unit.

The processing unit is configured to determine whether only one of a plurality of links is successfully established.

The transceiver unit is configured to: when the processing unit determines that only one of the plurality of links is successfully established, perform air interface transmission with a second MLD according to a single-link communication rule.

With reference to the fifth aspect, in some implementations of the fifth aspect, the transceiver unit is configured to send, to the second MLD, a first frame over the air, where an address 2 field in the first frame over the air is set to a media access control MAC address of the first MLD.

With reference to the fifth aspect, in some implementations of the fifth aspect, an address 1 field in the first frame over the air is set to a MAC address of the second MLD.

With reference to the fifth aspect, in some implementations of the fifth aspect, the transceiver unit is further configured to receive, from the second MLD, a second frame over the air, where an address 1 field in the second frame over the air is set to the MAC address of the first MLD.

With reference to the fifth aspect, in some implementations of the fifth aspect, an address 2 field in the second frame over the air is set to the MAC address of the second MLD.

With reference to the fifth aspect, in some implementations of the fifth aspect, the transceiver unit is further configured to send a first request frame to the second MLD, where the first request frame is used to request to establish a plurality of links. The transceiver unit is further configured to receive a first response frame from the second MLD, where the first response frame does not include a first multi-link element.

With reference to the fifth aspect, in some implementations of the fifth aspect, only one of the plurality of links is successfully established through multi-link reconfiguration.

According to a sixth aspect, a second multi-link device MLD is provided, including:

a processing unit and a transceiver unit connected to the processing unit.

The processing unit is configured to determine whether only one of a plurality of links is successfully established.

The transceiver unit is configured to: when the processing unit determines that only one of the plurality of links is successfully established, perform air interface transmission with a first MLD according to a single-link communication rule.

With reference to the sixth aspect, in some implementations of the sixth aspect, the transceiver unit is configured to send, to the first MLD, a second frame over the air, where an address 1 field in the second frame over the air is set to a media access control MAC address of the first MLD.

With reference to the sixth aspect, in some implementations of the sixth aspect, an address 2 field in the second frame over the air is set to a MAC address of the second MLD.

With reference to the sixth aspect, in some implementations of the sixth aspect, the transceiver unit is further configured to receive, from the first MLD, a first frame over the air, where an address 2 field in the first frame over the air is set to the MAC address of the first MLD.

With reference to the sixth aspect, in some implementations of the sixth aspect, an address 1 field in the first frame over the air is set to the MAC address of the second MLD.

With reference to the sixth aspect, in some implementations of the sixth aspect, the transceiver unit is further configured to receive a first request frame from the first MLD, where the first request frame is used to request to establish a plurality of links. The transceiver unit is further configured to send a first response frame to the first MLD, where the first response frame does not include a first multi-link element.

With reference to the sixth aspect, in some implementations of the sixth aspect, only one of the plurality of links is successfully established through multi-link reconfiguration.

According to a seventh aspect, a first multi-link device MLD is provided, and the first MLD includes a unit configured to perform the method according to any implementation of the third aspect.

According to an eighth aspect, a second multi-link device MLD is provided, and the second MLD includes a unit configured to perform the method according to any implementation of the fourth aspect.

According to a ninth aspect, a communication device is provided, which includes a processor. When the communication device runs, the processor executes a computer program or instructions stored in a memory, so that the communication device performs the method according to any possible implementation of the first aspect to the fourth aspect. The memory may be located in the processor, or may be implemented by using a chip independent of the processor. This is not specifically limited in this application.

According to a tenth aspect, a computer-readable storage medium is provided, which includes a computer program. When the computer program runs on a computer, the computer is enabled to perform the method according to any possible implementation of the first aspect to the fourth aspect.

According to an eleventh aspect, a chip is provided. A processing circuit is disposed on the chip, and the processing circuit is configured to perform the method according to any possible implementation of the first aspect to the fourth aspect.

According to a twelfth aspect, a computer program product is provided. The computer program product includes: a computer program (or may be referred to as code or instructions). When the computer program is run, the computer is enabled to perform the method according to any possible implementation of the first aspect to the fourth aspect.

According to a thirteenth aspect, a communication system is provided, which includes the foregoing first MLD and second MLD.

DESCRIPTION OF EMBODIMENTS

The following describes technical solutions of this application with reference to accompanying drawings.

An embodiment of this application provides a communication method applied to a wireless communication system. The wireless communication system may be a wireless local area network (wireless local area network, WLAN). The method may be implemented by a communication device in the wireless communication system or a chip or a processor in the communication device. The communication device may be a multi-link device (multi-link device, MLD). For example, the multi-link device may be an access point (access point, AP) MLD, or may be a non-access point MLD (non AP MLD), for example, a station (station, STA) MLD.

For ease of understanding embodiments of this application, communication systems to which embodiments of this application are applicable are described in detail with reference to FIG. 1 and FIG. 2.

Figure 1:
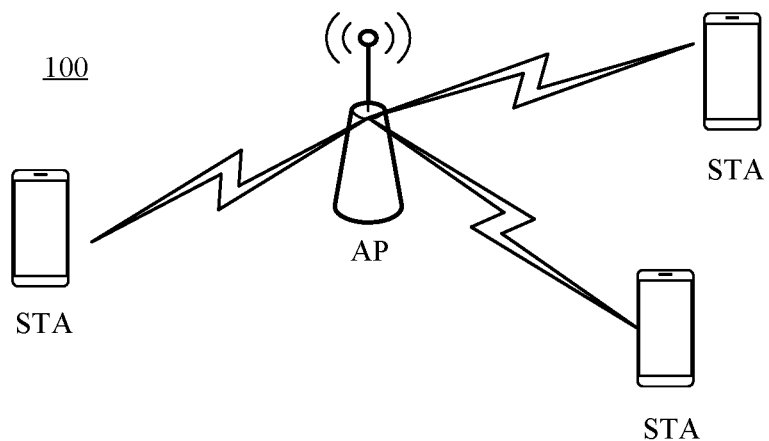
FIG. 1 is an architecture of a communication system to which an embodiment of this application is applicable.

FIG. 1 is a schematic diagram of a wireless communication system 100 to which embodiments of this application are applicable.

The wireless communication system 100 includes a STA and an AP.

The STA may also be referred to as a subscriber unit, an access terminal, a mobile station, a mobile console, a remote station, a remote terminal, a mobile device, a user terminal, a terminal, a wireless communication device, a user agent, a user apparatus, or user equipment (user equipment, UE). The STA may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless local area network (for example, Wi-Fi) communication function, a wearable device, a computing device, or another processing device connected to a wireless modem.

The AP may be configured to transmit data of the STA to a network side, or transmit data from a network side to the STA.

Figure 2:
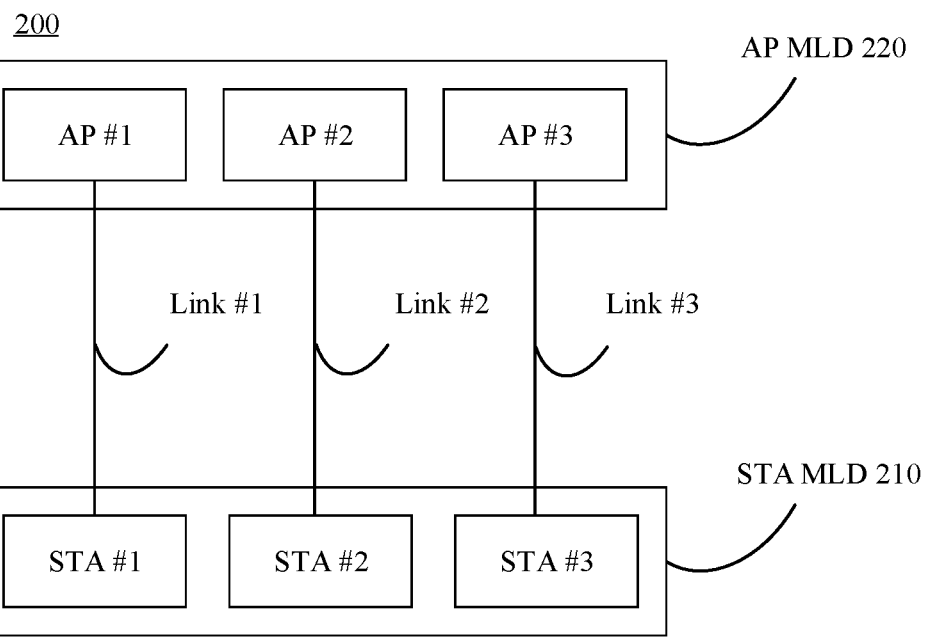
FIG. 2 is an architecture of a communication system to which an embodiment of this application is applicable.

FIG. 2 is a schematic diagram of a wireless communication system 200 to which embodiments of this application are applicable. As shown in FIG. 2, the wireless communication system 200 may include a STA MLD 210 and an AP MLD 220.

The STA MLD 210 may include a plurality of subdevices, and the AP MLD 220 may also include a plurality of subdevices. It should be understood that FIG. 2 is merely an example for description, and quantities of subdevices included in the STA MLD 210 and the AP MLD 220 are not limited in this application.

As shown in FIG. 2, the STA MLD 210 may include a STA #1, a STA #2, and a STA #3, and the AP MLD 220 may include an AP #1, an AP #2, and an AP #3. When all three links between the STA MLD 210 and the AP MLD 220 are successfully established, the AP #1 may communicate with the STA #1 over a link #1, the AP #2 may communicate with the STA #2 over a link #2, and the AP #3 may communicate with the STA #3 over a link #3.

In this application, a first multi-link device (multi-link device, MLD) may be a STA MLD, and a second MLD may be an AP MLD; or the first MLD may be an AP MLD, and the second MLD may be a STA MLD; or both the first MLD and the second MLD may be AP MLDs; or both the first MLD and the second MLD may be STA MLDs. This is not limited in this application. The following describes an example in which the first MLD is a STA MLD (for example, the STA MLD 210 in FIG. 2) and the second MLD is an AP MLD (for example, the AP MLD 220 in FIG. 2).

The following describes in detail embodiments provided in this application with reference to the accompanying drawings.

Figure 3:
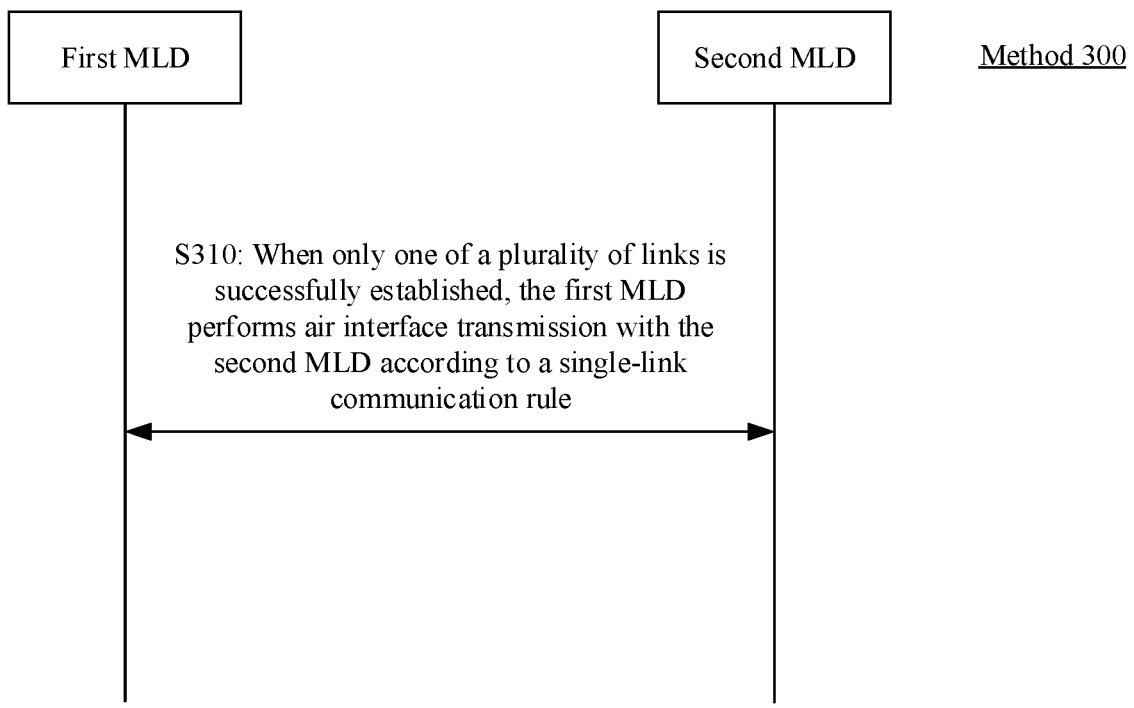
FIG. 3 is a schematic diagram of a method according to this application.

FIG. 3 is a schematic diagram of a communication method 300 according to an embodiment of this application. The method 300 may include the following steps.

S310: When only one of a plurality of links is successfully established, a first MLD performs air interface transmission with a second MLD according to a single-link communication rule.

The following describes several possible manners in which the first MLD performs air interface transmission with the second MLD according to the single-link communication rule.

Possible manner 1: The first MLD performing air interface transmission with the second MLD according to the single-link communication rule includes: The first MLD sends, to the second MLD, a first frame over the air, where an address 2 (address 2) field in the first frame over the air is set to a media access control (media access control, MAC) address of the first MLD.

The address 2 field is a transmit address (TA) of a frame over the air.

The frame over the air may further include another address field, for example, an address 1 (address 1) field and an address 3 (address 3) field. The address 1 field is a receive address (RA) of the frame over the air. In one case, the address 3 field may be a basic service set identifier (basic service set identifier, BSSID) of an AP. It should be understood that, in some cases, the address 3 field may have another meaning. For details, refer to a conventional technology.

Meanings of the address 1 field, the address 2 field, and the address 3 field are not described in the following.

According to the possible manner 1, an address 1 field in the first frame over the air may be set in the following several manners:

(1) The address 1 field in the first frame over the air is set to a MAC address of the second MLD.
(2) The address 1 field in the first frame over the air is set to a MAC address of an AP #m. The AP #m is an AP corresponding to the only one link. For example, it is assumed that only one link (for example, denoted as a link #m) of a plurality of links between the first MLD and the second MLD is successfully established, and the link #m is a link between a STA #m included in the first MLD and an AP #m included in the second MLD. Meanings of the STA #m and the AP #m are not described in the following.
(3) The address 1 field in the first frame over the air is set to a broadcast address. In this manner, the address 3 field in the first frame over the air is set to a BSSID of an AP #m.
(4) The address 1 field in the first frame over the air is set to a MAC address of the second MLD. In this manner, the address 3 field in the first frame over the air is set to a BSSID of an AP #m.

According to the possible manner 1, when only one of the plurality of links is successfully established, the address 2 field carried in the first frame over the air that is sent by the first MLD may be the MAC address of the first MLD. In a secure procedure, an address used by the first MLD for key generation may also be the MAC address of the first MLD. Therefore, the address used by the first MLD for key generation may be consistent with the address 2 field carried in air interface transmission.

Possible manner 2: The first MLD performing air interface transmission with the second MLD according to the single-link communication rule further includes: The second MLD sends, to the first MLD, a second frame over the air, where an address 1 field in the second frame over the air is set to a MAC address of the first MLD.

According to the possible manner 2, an address 2 field in the second frame over the air may be set in the following several manners:

(1) The address 2 field in the second frame over the air is set to a MAC address of the second MLD.

(2) The address 2 field in the second frame over the air is set to a MAC address of an AP #m.

(3) The address 2 field in the second frame over the air is set to a MAC address of the second MLD. In this manner, an address 3 field in the second frame over the air is set to a BSSID of an AP #m.

According to the possible manner 2, when only one of the plurality of links is successfully established, the address 2 field carried in the second frame over the air that is sent by the second MLD may be the MAC address of the second MLD. In a secure procedure, an address used by the second MLD for key generation may also be the MAC address of the second MLD. Therefore, the address used by the second MLD for key generation may be consistent with the address 2 field carried in air interface transmission.

Possible manner 3: The first MLD performing air interface transmission with the second MLD according to the single-link communication rule includes: The first MLD sends, to the second MLD, a first frame over the air, where an address 2 field in the first frame over the air is set to a MAC address of a STA #m.

According to the possible manner 3, an address 1 field in the first frame over the air may be set in the following several manners:

(1) The address 1 field in the first frame over the air is set to a MAC address of the second MLD.

(2) The address 1 field in the first frame over the air is set to a MAC address of an AP #m.

(3) The address 1 field in the first frame over the air is set to a MAC address of the second MLD. In this manner, an address 3 field in the first frame over the air is set to a BSSID of an AP #m.

(4) The address 1 field in the first frame over the air is set to a broadcast address. In this manner, an address 3 field in the first frame over the air is set to a BSSID of an AP #m.

Possible manner 4: The first MLD performing air interface transmission with the second MLD according to the single-link communication rule further includes: The second MLD sends, to the first MLD, a second frame over the air, where an address 1 field in the second frame over the air is set to a MAC address of a STA #m.

According to the possible manner 4, an address 2 field in the second frame over the air may be set in the following several manners:

(1) The address 2 field in the second frame over the air is set to a MAC address of the second MLD.

(2) The address 2 field in the second frame over the air is set to a MAC address of an AP #m.

(3) The address 2 field in the second frame over the air is set to a MAC address of the second MLD. In this manner, an address 3 field in the second frame over the air is set to a BSSID of an AP #m.

The foregoing describes several possible manners in which the first MLD performs air interface transmission with the second MLD according to the single-link communication rule.

The following describes several manners in which only one of a plurality of links is successfully established.

Possible manner 1: The first MLD sends a first request frame to the second MLD, where the first request frame is used to request to establish a plurality of links; and the second MLD sends a first response frame to the first MLD, where the first response frame does not include a multi-link element. Further, optionally, a frame body of the first response frame may include a first field, and the first field indicates that only one link is successfully established. For example, the first field is a status code (status code) field.

The first request frame may be, for example, an association request frame (association request frame), and the first response frame is an association response frame (association response frame). Alternatively, the first request frame may be, for example, a reassociation request frame (reassociation request frame), and the first response frame is a reassociation response frame (reassociation response frame).

The multi-link element may be a basic variant multi-link element (basic variant multi-link element).

The architecture shown in FIG. 2 is used as an example. In a possible implementation, the first MLD may send a first request frame to the AP #1 by using the STA #1, where the first request frame is used to request to establish a plurality of links. If only one of the plurality of links requested by the first MLD is successfully established, the second MLD sends a first response frame to the first MLD, where the first response frame does not include a first multi-link element, and the successfully established link may be a link for transmitting the first request frame and the first response frame, for example, the link #1.

According to the possible manner 1, when the first response frame does not include the first multi-link element, the first response frame may implicitly indicate that only one link (for example, the link #1) in the plurality of links requested by the first MLD is successfully established, and when the first response frame does not include the first multi-link element, resource consumption for transmission of the first response frame can be reduced.

In a possible case, when the link for sending the first request frame and the first response frame fails to be established, the first response frame may not include the multi-link element.

Possible manner 2: Only one of a plurality of links is successfully established through multi-link reconfiguration.

For example, the plurality of links may be a plurality of links that have been successfully established (for example, a plurality of links that have been successfully established previously), and only one of the plurality of links is successfully established (or only one of the plurality of links that have been successfully established is available) through multi-link reconfiguration.

A device for performing multi-link reconfiguration is not limited in this application.

For example, the first MLD sends a third request frame to the second MLD, where the third request frame requests for multi-link reconfiguration, and the third request frame carries a multi-link element. The second MLD sends a third response frame to the first MLD. The third response frame is used to respond to the third request frame. The third response frame may carry a multi-link element or may not carry a multi-link element, so that only one link remains in the plurality of links that are originally successfully established between the first MLD and the second MLD.

For another example, the second MLD sends a third request frame to the first MLD, where the third request frame requests for multi-link reconfiguration, and the third request frame carries a multi-link element. The first MLD sends a third response frame to the second MLD. The third response frame is used to respond to the third request frame. The third response frame may carry a multi-link element or may not carry a multi-link element, so that only one link remains in the plurality of links that are originally successfully established between the first MLD and the second MLD.

For still another example, the second MLD sends a first radio frame to the first MLD, where the first radio frame carries a multi-link element, so that only one link remains in the plurality of links that are originally successfully established between the first MLD and the second MLD.

Possible manner 3: The first MLD sends a first request frame to the second MLD, where the first request frame is used to request to establish a plurality of links; and the second MLD sends a first response frame to the first MLD, where the first response frame includes a first multi-link element and a first field, and the first field indicates that only one link (for example, the link #1) is successfully established.

In this manner, the first multi-link element indicates that other links other than the link #1 in the plurality of links requested by the first MLD fail to be established. For example, the first multi-link element includes a link information field (link info field), the link information field includes a profile sub-element corresponding to each of the other links, each profile sub-element includes a status code field, and the status code field included in each profile sub-element indicates that a link corresponding to the profile sub-element fails to be established. In a possible implementation, the status code field included in each profile sub-element indicates a failure cause (failure cause).

According to the possible manner 3, when the first response frame includes the first multi-link element, the first multi-link element indicates that in the plurality of links that the first MLD requests to establish, other links other than the link #1 fail to be established, and the first response frame may explicitly indicate that only the link #1 in the plurality of links that the first MLD requests to establish is successfully established.

According to the solution in this application, when only one of the plurality of links is successfully established, the first MLD performs air interface transmission with the second MLD according to the single-link communication rule. For example, according to the possible manner 1 or the possible manner 3, the first MLD and the second MLD consider that multiple links fail to be established. In other words, the first MLD and the second MLD no longer request to establish a plurality of links, but actually only one link is established, and it is considered that the plurality of links are successfully established.

The foregoing several possible manners are examples for description. Only one of the plurality of links being successfully established may be alternatively implemented in another manner. This is not limited in this application.

It may be understood that some of the foregoing embodiments describe an example in which the frame over the air includes the address 1 field, the address 2 field, and the address 3 field. This is not limited in this application. For example, the frame over the air may further include an address 4 (address 4) field.

It may be understood that, in the foregoing method embodiments, the methods and operations implemented by a multi-link device (for example, the first MLD, or the second MLD) may also be implemented by a component (for example, a chip or a circuit) of the multi-link device.

Corresponding to the methods provided in the foregoing method embodiments, an embodiment of this application further provides a corresponding apparatus. The apparatus includes a corresponding module configured to perform the foregoing method embodiments. The module may be software, hardware, or a combination of software and hardware.

It may be understood that the technical features described in the method embodiments are also applicable to the following apparatus embodiments.

Figure 4:
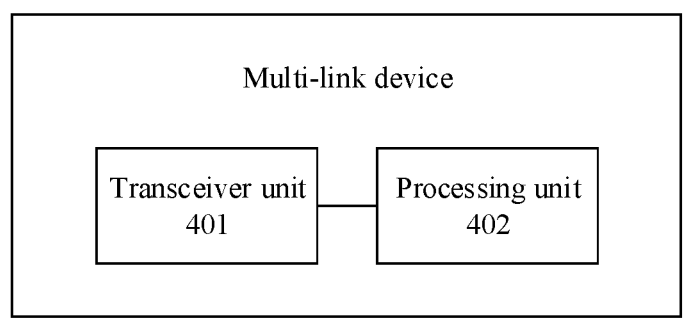
FIG. 4 is a schematic block diagram of a multi-link device according to this application.

FIG. 4 is a multi-link device (for example, the first multi-link device or the second multi-link device) according to an embodiment of this application. The multi-link device may include a transceiver unit 401 and a processing unit 402.

The transceiver unit 401 may be configured to implement a corresponding communication function. For example, the transceiver unit 401 may be used by the first multi-link device MLD to perform air interface transmission with the second MLD according to a single-link communication rule. The transceiver unit 401 may also be referred to as a communication interface or a communication unit.

The processing unit 402 may be configured to perform a processing operation. For example, the processing unit 402 may be configured to determine whether only one of a plurality of links is successfully established.

Optionally, the multi-link device further includes a storage unit. The storage unit may be configured to store instructions and/or data. The processing unit 402 may read the instructions and/or data in the storage unit, to implement an action performed by the first multi-link device in the foregoing method embodiments, or implement an action performed by the second multi-link device in the foregoing method embodiments.

In a first design, the multi-link device may be the first MLD in the foregoing embodiments, or may be a component (for example, a chip) of the first MLD. The multi-link device may implement steps or procedures performed by the first MLD in the foregoing method embodiments. The transceiver unit 401 may be configured to perform operations related to sending and receiving of the first MLD in the foregoing method embodiments, and the processing unit 402 may be configured to perform operations related to processing of the first MLD in the foregoing method embodiments.

Specifically, the processing unit 402 may be configured to determine whether only one of the plurality of links is successfully established; and the transceiver unit 401 is configured to: when the processing unit 402 determines that only one of the plurality of links is successfully established, perform air interface transmission with the second MLD according to the single-link communication rule.

In a possible implementation, the transceiver unit 401 is further configured to send, to the second MLD, a first frame over the air, where an address 2 field in the first frame over the air is set to a media access control MAC address of the first MLD.

Optionally, an address 1 field in the first frame over the air is set to a MAC address of the second MLD.

In another possible implementation, the transceiver unit 401 is further configured to receive, from the second MLD, a second frame over the air, where an address 1 field of the second frame over the air is set to the MAC address of the first MLD.

Optionally, an address 2 field in the second frame over the air is set to the MAC address of the second MLD.

In another possible implementation, the transceiver unit 401 is further configured to send a first request frame to the second MLD, where the first request frame is used to request to establish a plurality of links; and the transceiver unit 401 is further configured to receive a first response frame from the second MLD, where the first response frame does not include a multi-link element.

In another possible implementation, the processing unit 402 is configured to determine whether only one of the plurality of links is successfully established through multi-link reconfiguration.

In a second design, the multi-link device may be the second MLD in the foregoing embodiments, or may be a component (for example, a chip) of the second MLD. The multi-link device may implement steps or procedures performed by the second MLD in the foregoing method embodiments. The transceiver unit 401 may be configured to perform operations related to sending and receiving of the second MLD in the foregoing method embodiments, and the processing unit 402 may be configured to perform operations related to processing of the second MLD in the foregoing method embodiments.

Specifically, the processing unit 402 may be configured to determine whether only one of the plurality of links is successfully established; and the transceiver unit 401 is configured to: when the processing unit 402 determines that only one of the plurality of links is successfully established, perform air interface transmission with the first MLD according to the single-link communication rule.

In a possible implementation, the transceiver unit 401 is further configured to send, to the first MLD, a second frame over the air, where an address 1 field in the second frame over the air is set to a media access control MAC address of the first MLD.

Optionally, an address 2 field in the second frame over the air is set to the MAC address of the second MLD.

In another possible implementation, the transceiver unit 401 is further configured to receive, from the first MLD, a first frame over the air, where an address 2 field of the first frame over the air is set to the MAC address of the first MLD.

Optionally, an address 1 field in the first frame over the air is set to the MAC address of the second MLD.

In another possible implementation, the transceiver unit 401 is further configured to receive a first request frame from the first MLD, where the first request frame is used to request to establish a plurality of links; and the transceiver unit 401 is further configured to send a first response frame to the first MLD, where the first response frame does not include a multi-link element.

In another possible implementation, the processing unit 402 is configured to determine whether only one of the plurality of links is successfully established through multi-link reconfiguration.

It should be understood that a specific process in which the units perform the foregoing corresponding steps is described in detail in the foregoing method embodiments. For brevity, details are not described herein.

It should be further understood that the multi-link device herein is presented in a form of a functional unit. The term "unit" herein may refer to an application-specific integrated circuit (application-specific integrated circuit, ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the multi-link device may be specifically the first MLD in the foregoing embodiments, and may be configured to perform the procedures and/or the steps corresponding to the first MLD in the foregoing method embodiments. Alternatively, the multi-link device may be specifically the second MLD in the foregoing embodiments, and may be configured to perform the procedures and/or the steps corresponding to the second MLD in the foregoing method embodiments. To avoid repetition, details are not described herein again.

The multi-link device in the foregoing solutions has a function of implementing corresponding steps performed by the multi-link device (for example, the first MLD or the second MLD) in the foregoing method. The function may be implemented by hardware, or may be implemented by hardware executing corresponding software. The hardware or software includes one or more modules corresponding to the foregoing function. For example, a transceiver unit may be replaced with a transceiver (for example, a sending unit in the transceiver unit may be replaced with a transmitter, and a receiving unit in the transceiver unit may be replaced with a receiver), and another unit such as a processing unit may be replaced with a processor, to separately perform sending and receiving operations and a related processing operation in the method embodiments.

In addition, the transceiver unit 401 may alternatively be a transceiver circuit (for example, the transceiver circuit may include a receiver circuit and a transmitter circuit), and the processing unit may be a processing circuit.

It should be noted that, the multi-link device in FIG. 4 may be the first MLD or the second MLD in the foregoing embodiments, or may be a chip or a chip system, for example, a system on chip (system on chip, SoC). The transceiver unit may be an input/output circuit or a communication interface. The processing unit is a processor, a microprocessor, or an integrated circuit integrated on the chip. This is not limited herein.

Figure 5:
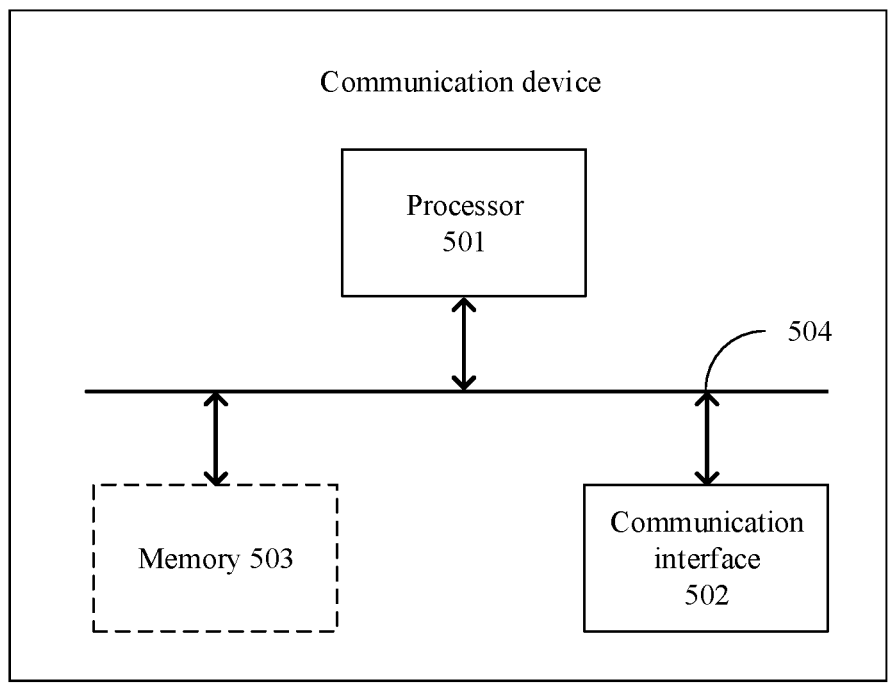
FIG. 5 is a schematic block diagram of a communication device according to this application.

An embodiment of this application further provides a communication device. As shown in FIG. 5, the communication device includes a processor 501. The processor 501 is configured to execute a computer program or instructions stored in a memory 503, or read data stored in a memory 503, to perform the methods in the foregoing method embodiments. Optionally, there are one or more processors 501. The communication device further includes a communication interface 502, and the communication interface 502 is configured to send and/or receive a signal. For example, the processor 501 is configured to control the communication interface 502 to send and/or receive a signal.

Optionally, as shown in FIG. 5, the communication device further includes a memory 503, and the memory 503 is configured to store a computer program or instructions and/or data. The memory 503 may be integrated with the processor 501, or may be disposed separately. Optionally, there are one or more memories 503.

Optionally, the processor 501, the communication interface 502, and the memory 503 are connected to each other by using a bus 504. The bus 504 may be a peripheral component interconnect (peripheral component interconnect, PCI) bus, an extended industry standard architecture (extended industry standard architecture, EISA) bus, or the like. The bus 504 may be classified into an address bus, a data bus, a control bus, and the like. For ease of representation, only one bold line is used to represent the bus in FIG. 5, but this does not mean that there is only one bus or only one type of bus.

In another solution, the communication device is configured to implement the operations performed by the multi-link device in the foregoing method embodiments.

For example, when the communication device is a first MLD, the processor 501 is configured to determine that only one of a plurality of links is successfully established; and the communication interface 502 is configured to: when the processor 501 determines that only one of the plurality of links is successfully established, perform air interface transmission with a second MLD according to a single-link communication rule.

For another example, when the communication device is a second MLD, the processor 501 is configured to determine that only one of a plurality of links is successfully established; and the communication interface 502 is configured to: when the processor 501 determines that only one of the plurality of links is successfully established, perform air interface transmission with a first MLD according to a single-link communication rule.

It should be understood that a processor (such as the processor 501) mentioned in embodiments of this application may be a central processing unit (central processing unit, CPU), a network processor (network processor, NP), or a combination of a CPU and an NP. The processor may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable logic gate array (field-programmable gate array, FPGA), a generic array logic (generic array logic, GAL), or any combination thereof.

It may be further understood that a memory (such as the memory 503) mentioned in embodiments of this application may be a volatile memory or a non-volatile memory, or may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache.

A person of ordinary skill in the art may be aware that, in combination with the units and algorithm steps in the examples described in embodiments disclosed in this specification, this application can be implemented by electronic hardware or a combination of computer software and electronic hardware. Whether the functions are implemented by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. A part or all of the units may be selected according to actual requirements to achieve the objectives of the solutions of the embodiments.

In addition, functional units in embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
    sending, by a first station (STA) of a station multi-link device (STA MLD), a request frame to an access point multi-link device (AP MLD), wherein the request frame requests to establish single-link communication, and an address 2 field in the request frame is set to a media access control (MAC) address of the STA MLD;
    receiving, by the first STA, a response frame from the AP MLD, wherein the response frame indicates that the single-link communication is successfully established, wherein an address 1 field in the response frame is set to the MAC address of the STA MLD; and
    performing, by the first STA, air interface transmission with the AP MLD according to the single-link communication.

2. The communication method according to claim 1, wherein the request frame and the response frame do not carry a multi-link element.

3. The communication method according to claim 1, wherein the performing, by the first STA, air interface transmission with the AP MLD according to the single-link communication comprises:
    sending, by the first STA to the AP MLD, a first frame over the air, wherein an address 2 field in the first frame over the air is set to the MAC address of the STA MLD.

4. The communication method according to claim 3, wherein an address 1 field in the first frame over the air is set to a MAC address of a first AP, the first AP belongs to the AP MLD, and a single link is a communication link between the first AP and the first STA.

5. The communication method according to claim 1, wherein the performing, by the first STA, air interface transmission with the AP MLD according to a single-link communication rule comprises:
receiving, by the first STA from the AP MLD, a second frame over the air, wherein an address 1 field in the second frame over the air is set to the MAC address of the STA MLD.

6. The communication method according to claim 5, wherein an address 2 field in the second frame over the air is set to the MAC address of a first AP, the first AP belongs to the AP MLD, and a single link is a communication link between the first AP and the first STA.

7. A communication apparatus, used in a first station (STA) of a station multi-link device (STA MLD), and comprising at least one processor and at least one communication interface, wherein the at least one communication interface is used by the communication apparatus to perform information exchange with another communication device, and when program instructions are executed by at least one processor, the communication apparatus is enabled to perform:
sending a request frame to an access point multi-link device (AP MLD), wherein the request frame requests to establish single-link communication, and an address 2 field in the request frame is set to a media access control (MAC) address of the STA MLD;
receiving a response frame from the AP MLD, wherein the response frame indicates that the single-link communication is successfully established, wherein an address 1 field in the response frame is set to the MAC address of the STA MLD; and
performing air interface transmission with the AP MLD according to a single-link communication rule.

8. The communication apparatus according to claim 7, wherein the request frame and the response frame do not carry a multi-link element.

9. The communication apparatus according to claim 7, wherein the communication device is further enabled to perform:
sending, to the AP MLD, a first frame over the air, wherein an address 2 field in the first frame over the air is set to the MAC address of the STA MLD.

10. The communication apparatus according to claim 9, wherein an address 1 field in the first frame over the air is set to a MAC address of a first AP, the first AP belongs to the AP MLD, and a single link is a communication link between the first AP and the first STA.

11. The communication apparatus according to claim 7, wherein the communication device is further enabled to perform:
receiving, from the AP MLD, a second frame over the air, wherein an address 1 field in the second frame over the air is set to the MAC address of the STA MLD.

12. The communication apparatus according to claim 11, wherein an address 2 field in the second frame over the air is set to the MAC address of a first AP, the first AP belongs to the AP MLD, and a single link is a communication link between the first AP and the first STA.

13. A communication method, comprising:
receiving, by an access point multi-link device (AP MLD), a request frame from a first station (STA) of a station multi-link device (STA MLD), wherein the request frame requests to establish single-link communication, and an address 2 field in the request frame is set to a media access control (MAC) address of the STA MLD;
sending, by the AP MLD, a response frame to the first STA, wherein the response frame indicates that the single-link communication is successfully established, wherein an address 1 field in the response frame is set to the MAC address of the STA MLD; and
performing, by the AP MLD, air interface transmission with the first STA according to the single-link communication.

14. The communication method according to claim 13, wherein the request frame and the response frame do not carry a multi-link element.

15. The communication method according to claim 13, wherein the performing, by the AP MLD, air interface transmission with the first STA according to the single-link communication comprises:
receiving, by the AP MLD from the first STA, a first frame over the air, wherein an address 2 field in the first frame over the air is set to the MAC address of the STA MLD.

16. The communication method according to claim 15, wherein an address 1 field in the first frame over the air is set to a MAC address of a first AP, the first AP belongs to the AP MLD, and a single link is a communication link between the first AP and the first STA.

17. The communication method according to claim 13, wherein the performing, by the AP MLD, air interface transmission with the first STA according to the single-link communication comprises:
sending, by the AP MLD to the first STA, a second frame over the air, wherein an address 1 field in the second frame over the air is set to the MAC address of the STA MLD.

* * * * *